United States Patent
Chesher et al.

(10) Patent No.: US 12,369,009 B2
(45) Date of Patent: Jul. 22, 2025

(54) SYSTEM AND METHOD FOR EMERGENCY VEHICLE LOCATION SYSTEM

(71) Applicant: Andrew Allen Chesher, Sturgis, MI (US)

(72) Inventors: Andrew Allen Chesher, Sturgis, MI (US); Patricia Sue Chesher, Sturgis, MI (US)

(73) Assignee: Andrew Chesher, Sturgis, MI (US)

( * ) Notice: Subject to any disclaimer, the term of this patent is extended or adjusted under 35 U.S.C. 154(b) by 82 days.

(21) Appl. No.: 18/347,933

(22) Filed: Jul. 6, 2023

(65) Prior Publication Data

US 2025/0014458 A1    Jan. 9, 2025

(51) Int. Cl.
*H04W 4/02* (2018.01)
*H04W 4/029* (2018.01)
*H04W 4/40* (2018.01)
*H04W 4/90* (2018.01)

(52) U.S. Cl.
CPC ............. *H04W 4/02* (2013.01); *H04W 4/025* (2013.01); *H04W 4/029* (2018.02); *H04W 4/40* (2018.02); *H04W 4/90* (2018.02)

(58) Field of Classification Search
CPC .... B64F 1/00; B64F 1/007; B64F 1/32; B60P 3/00; H04W 4/02; H04W 4/029; H04W 4/14; H04W 4/90; H04W 4/92
See application file for complete search history.

(56) References Cited

U.S. PATENT DOCUMENTS

| | | | |
|---|---|---|---|
| 5,522,540 A | 6/1996 | Surman | |
| 7,382,252 B2 | 6/2008 | Brannon | |
| 7,817,033 B2 | 10/2010 | Motoyama | |
| 10,497,229 B2 | 12/2019 | Bauldree et al. | |
| 2019/0253861 A1* | 8/2019 | Horelik | H04W 64/006 |
| 2019/0313230 A1* | 10/2019 | MacGabann | H04W 4/90 |
| 2020/0079530 A1* | 3/2020 | Walsh | B64F 1/007 |
| 2021/0300229 A1* | 9/2021 | Nakano | G06Q 50/60 |

* cited by examiner

*Primary Examiner* — Van T Trieu
(74) *Attorney, Agent, or Firm* — Briggs Intellectual Property Law; Jeremy A. Briggs

(57) ABSTRACT

A method for facilitating sharing location between an emergency responder and a requester is disclosed. The method comprises initiating an emergency request using a means for alerting to alert an emergency responder 102. Further receiving live location update by the requestor, of the emergency responder 102. Determining proximity of the emergency responder 102 by the first processor 120 provided within the means for alerting 106. The method further comprises sending a signal to the controller 126 via the first network 130 to activate the speaker system 122, and/or the at one light source 124, based on the proximity of the emergency responder 102. Further changing the intensity of the speaker system 122 and/or the at one light source 124, based on the proximity of the emergency responder 102 so as to facilitate or assist the emergency responder 102 to locate the requestor 104.

16 Claims, 3 Drawing Sheets

SYSTEM AND METHOD FOR EMERGENCY VEHICLE LOCATION SYSTEM

FIELD

The present disclosure relates to emergency responder vehicle and more particularly to systems and methods for locating a mailbox or recreational vehicle requesting the emergency responder vehicle and sharing location of the emergency responder vehicle.

BACKGROUND

Presently, when an emergency call is placed by a requestor, the call is routed to a centralized call center. A user from the call center responds to the requestor and captures the necessary information, like type of emergency and location of the requestor. Further the user from the call center forwards the emergency request including the location to an emergency responder.

However, the drawback of the current process is the requestor is unaware of the location of the emergency responder. Further in-case the location of the requestor is from a densely populated area or a remote area, the emergency responder may find it difficult to locate the correct location.

Hence, there is need in the art that enables sharing of the location of a requestor and an emergency responder. Further there is a need to easily locate the requestor.

SUMMARY

In an implementation a system for facilitating location sharing between an emergency responder and a requester, is disclosed. The system may comprise a means for alerting. The means for alerting is accessible by the requester and is further configured to alert an emergency responder. Further a mailbox placed in a visible location on a periphery of a house, and the mailbox is communicably connected to the means for alerting. The mailbox may further comprise a first processor. The first processor may be communicably connected to a first global positioning system. Further a speaker system and at least one light source communicably connected to the first processor. Further a power source may be configured to provide power to the first processor, the first positioning system, the speaker and the at least one light source. Further the mailbox may comprise a first communication means configured to communicably connect the means for alerting with the mailbox.

In another implementation of the present disclosure a system for facilitating location sharing between an emergency responder and a requester is disclosed. The system may comprise a mailbox having a power source. The mailbox may further comprise a first communication means, installed withing the mailbox. Further a controller may be mounted within the mailbox, and communicably connected with the first communication. A speaker system may further be communicably connected to the controller via the first communication means. At least one light source may be further communicably connected to the controller via the first communication means. The system as disclosed may further comprise a mean for alerting, communicably connected with the mailbox via the first communication means. The means for alerting may be accessible by the requester and is further configured to alert an emergency service or an emergency responder. Further a first positioning system may be embedded within the means for alerting.

In yet another implementation a method for facilitating location sharing between an emergency responder and a requester, is disclosed. The method may start by initiating, by the requester, an emergency request using a means for alerting 106 to alert an emergency responder. Further receiving live location update by the requestor, of the emergency responder 102 via the second network or another network. The method may further comprise a step of determining proximity of the emergency responder by the first processor provided within the means for alerting. Further in accordance with the method sending a signal to the controller via the first network to activate the speaker system, and/or the at one light source, based on the proximity of the emergency responder. The method may further comprise a step of changing the intensity of the speaker system and/or the at one light source, based on the proximity of the emergency responder so as to facilitate or assist the emergency responder to locate the requestor.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
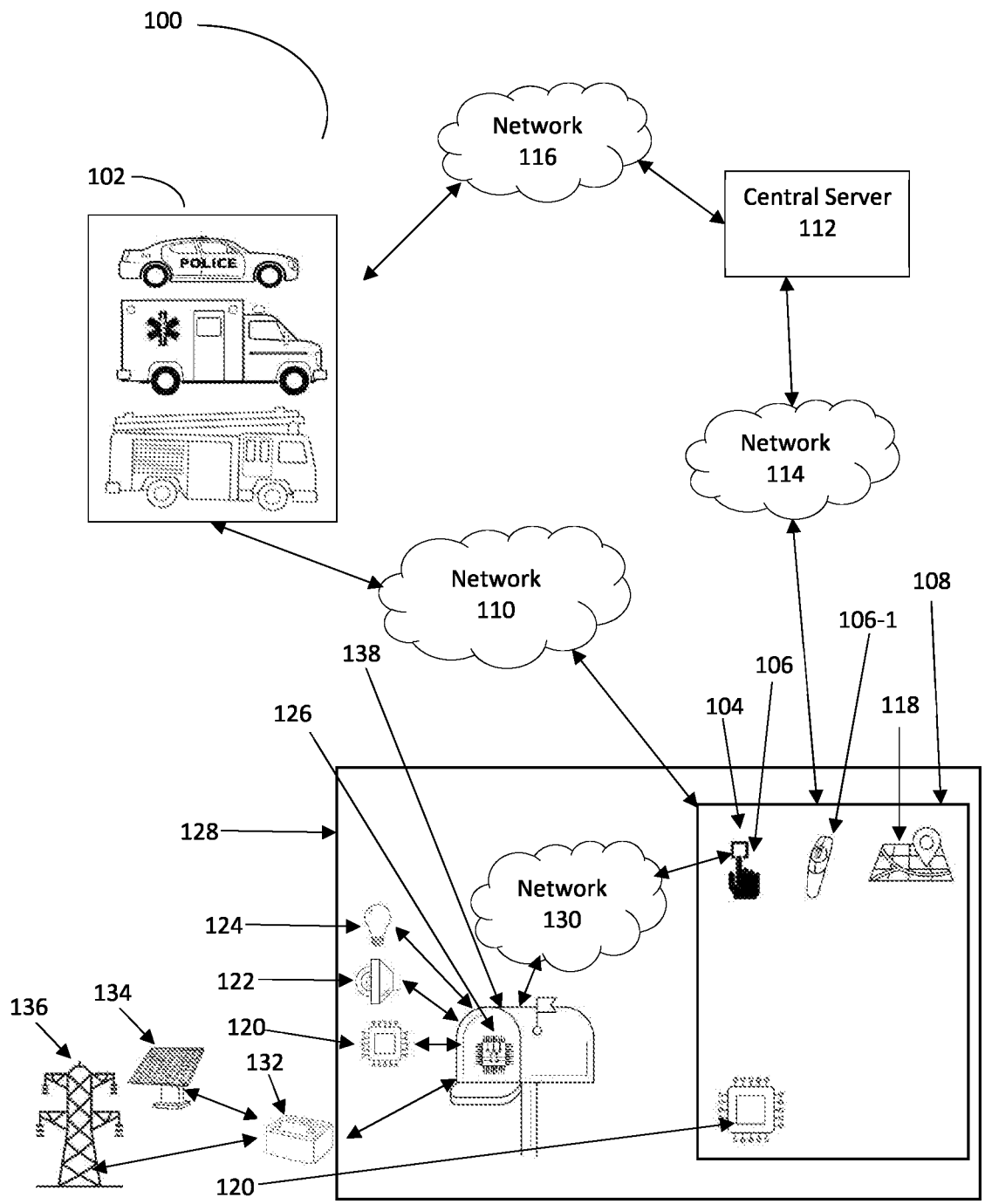
FIG. 1 illustrates a system for facilitating location sharing between an emergency responder and a requester, in accordance with an exemplary embodiment.

The present disclosure describes a system and methods for facilitating location sharing between an emergency responder and a requester. In accordance with the aspect of the disclosure a mean for alerting is disclosed. The means for alerting may be a remote switch or a switch fixed on at a specific location within a house or defined premises. Further the remote switch or the switch may be easily accessible by the requestor. In an exemplary embodiment the remote switch or the switch may be programed to send or broadcast a set of pre-defined messages to the emergency responder. For example, a requester device may activate or initiate an alert for medical assistance or assistance from law enforcement. Further based on the assistance requested by the requestor a defined message may be relayed to the emergency responder. The pre-defined message may further comprise details of location of the requestor, including but not limited to ZIP Code, street details, apartment or house number or geographical coordinates.

In another aspect of the disclosure the means for alerting may include an application or program operable by a mobile device. For example, the application may be operable by a smartphone, a tablet, a smart watch or other connected wearable device, or other mobile device may be configured to initiate a call or a communication with a remote server/emergency responder upon user activation.

According to another aspect, the mobile device may be configured to detect an emergency or receive user input indicative of an emergency situation and initiate a call or a communication channel or broadcast a pre-defined message to the emergency responder. Further the pre-defined message may be based on the assistance requested by the requestor and may further comprise details of location of the requestor, including but not limited to ZIP Code, street details, apartment or house number or geographical coordinates. The pre-defined message may further include specific location or directions that may be useful to direct a first responding vehicle to the location of the requestor. For example, the specific location or directions may include one or more landmarks, distance instructions, etc.

In yet another exemplary embodiment of the present aspect the means for alerting may be a phone, accessible by the requestor. Further the requestor may connect with the emergency responder over the phone line and communicate the necessary information.

Further in accordance with any of the exemplary means for alerting as disclosed the system and method for the facilitating location sharing between an emergency responder and a requester may include a mailbox. The mailbox may be placed or positioned around periphery of the house or premises such that the mailbox is visible to the emergency responder. Further the mailbox in accordance with the exemplary aspect may further comprise a speaker, and/or a light source. The mailbox may include independent power means such as a solar panel array integrated in the device, a rechargeable or disposable battery bank, and/or wired power connections such that the mailbox may be connectable to a low voltage (e.g., 12V) or standard voltage (e.g., 120V) power source.

The speaker, and/or the light source may be positioned on the mailbox such that the speaker, and/or the light source are easily audible and visible to the emergency responder. Further intensity of the speaker, and/or the light source can be changed or adapted based on proximity of the emergency responder so as to facilitate or assist the emergency responder to locate the location of the requestor.

The mailbox in accordance with another exemplary embodiment may include a controller. The controller may be connected to the speaker, and/or the light source, and further configured to control the intensity of the speaker, and/or the light source. The controller may receive instructions from a processor mounted within the mailbox or from the means for alerting. Further a power source may be configured to provide power to components within the mailbox like the processor, the speaker and/or light source, and the controller. The power source may be a solar panel or an electric grid connection and may be optionally connected to a battery to provide backup power in case of unavailability of power from the solar panel or the electric grid connection.

In another exemplary aspect, the mailbox may include a global positioning system to determine the geographical location of the mailbox. Further a means for communication may also be provided in the mailbox to communicate with the means for alerting. The means for the communication may include a router configured to communicate over Wi-Fi, Bluetooth, or any other communication means like Zigwig or NFC.

A system for facilitating location sharing between an emergency responder and a requester may include a means for alerting in accordance with an exemplary embodiment. The means for alerting may include an accessible switch in form of a remote switch or a switch fixed on at a specific location within a house or defined premises. Further the remote switch or the switch may be easily accessible by the requestor. The accessible switch may be programed to send or broadcast a set of pre-defined message directly to the emergency responder or may be routed through a central server. The central server may be manned by a user or an artificial intelligence application. Further the central server may be configured to capture the necessary information based on type of alert activated or initiated by the requestor For example, it can be for medical assistance or assistance from law enforcement. Based on the assistance requested by the requestor a defined message may be relayed to the emergency responder. The pre-defined message may further comprise details of location of the requestor, including but not limited to ZIP Code, street details, apartment or house number or geographical coordinates. The details pertaining to location of the requestor may be either shared by the requestor or may be captured from the pre-defined message or retrieved from a global positioning system.

In accordance with the exemplary aspect, the global positioning system may be communicably connected with the means for alerting. Further the global positioning system may be activated to determine the location of the requestor upon detecting trigger of the mean of alerting. The location of the requestor may be shared with the emergency responder via the same communication means configured to create connection between the requestor and the emergency responder by the means for alerting.

Further the global positioning system may be embedded into a mailbox or communicably connected to the mailbox. The mailbox may be placed or positioned around periphery of the house or premises such that the mailbox is visible to the emergency responder. Further the mailbox may include a speaker, and/or a light source. The speaker, and/or the light source may be positioned on the mailbox such that the speaker, and/or the light source are easily audible and visible to the emergency responder. Further intensity of the speaker, and/or the light source can be changed or adapted based on proximity of the emergency responder so as to facilitate or assist the emergency responder to locate the location of the requestor. To change the intensity of the speaker, and/or the light source, a controller may be connected to the speaker, and/or the light source. The controller may receive instructions from a processor mounted within the mailbox or from the means for alerting. The processor may be communicably connected to the controller and the means for alerting. Further the processor may be configured to determine the proximity of the emergency responder and the requestor by comparing the geographical coordinates of the requestor with the emergency responder. The processor may be configured to receive live or continuously updated geographical coordinates of the emergency responder via the means for alerting or by creating an independent communication channel with the responder.

Further a power source may be configured to provide power to components within the mailbox like the processor, the speaker and/or light source, and the controller. The power source may be a solar panel or an electric grid connection, and may be optionally connected to a battery to provide backup power in case of unavailability of power from the solar panel or the electric grid connection.

Another system for facilitating location sharing between an emergency responder and a requester may include an application operable using a mobile device. The application may be configured to cause the mobile device to initiate a call or a communication with a remote server/emergency responder upon activation by the user or an emergency situation. The mobile device may communicate using a first communication means with the emergency responder or may be routed through a central server. The central server may be manned by a user or an artificial intelligence application. Further the central server may be configured to capture the necessary information based on type of alert activated or initiated by the requestor For example, it can be for medical assistance or assistance from law enforcement.

Further location of the requestor may be determined by a global positioning system embedded into the mobile device or connected with the mobile device, and further send or share with the emergency responder. The mobile device may further be configured to capture or retrieve live location of the emergency responder. Further a processor embedded in the handheld may be configured to compute proximity of the emergency responder with the requestor.

In accordance with the exemplary embodiment, the mobile device may be further communicably connected via a second means for communication with a mailbox. The mailbox may be placed or positioned around periphery of the house or premises such that the mailbox is visible to the emergency responder. Further the mailbox may include a speaker, and/or a light source. The speaker, and/or the light source may be positioned on the mailbox such that the speaker, and/or the light source are easily audible and visible to the emergency responder. Further intensity of the speaker, and/or the light source can be changed or adapted based on proximity of the emergency responder so as to facilitate or assist the emergency responder to locate the location of the requestor. To change the intensity of the speaker, and/or the light source, a controller may be connected to the speaker, and/or the light source. The controller may receive instructions from the processor embedded into the mobile device via the second means for communication.

Further a power source may be configured to provide power to components within the mailbox like the speaker and/or light source, and the controller. The power source may be a solar panel or an electric grid connection and may be optionally connected to a battery to provide backup power in case of unavailability of power from the solar panel or the electric grid connection. These and other advantages of the present disclosure are provided in detail herein.

ILLUSTRATIVE EMBODIMENTS

The disclosure will be described more fully hereinafter with reference to the accompanying drawings, in which example embodiments of the disclosure are shown, and not intended to be limiting.

FIG. 1 illustrates a system for facilitating location sharing between an emergency responder and a requester, in accordance with an exemplary embodiment. The system 100 may include the emergency responder 102 and the requester 104. The requester 104 may initiate or activate an emergency request using a means for alerting. The means for alerting may further comprise an accessible switch 106 in form of a remote switch 106-1 or a switch 106-2 fixed at a specific location within a house 108 or defined premises 108. Further the accessible switch 106 may be positioned or located such that the accessible switch 106 may be easily accessed by the requestor 104 in an emergency situation.

In an aspect of the present disclosure the accessible switch 106 may be configured to enable a communication between the requestor 104 and the emergency responder 102 via a second network 110 configured to provide a second communication means. In another aspect of the system 100 the accessible switch 106 may be programed to send or broadcast a set of pre-defined messages directly to the emergency responder 102 using the second network 110. Further in accordance with another aspect of the disclosure the communication between the requestor 104 and the emergency responder 102 may be routed through a central server 112 using another network 114. The central server 112 may be manned by a user or an artificial intelligence application. Further the central server 112 may be configured to capture the necessary information based on type of alert activated or initiated by the requestor and share the same via independent network 116 with the emergency responder 102.

Further in accordance with the aspect of the disclosure the emergency responder 102 is configured to receive location of the requestor via either directly via the accessible switch 106 or from the central server 112. The location of the requestor may be represented in a geographical coordinates form that is determined using a first global positioning system 118. The first global positioning system 118 may be provided in the within a house 108 or the defined premises 108. In another aspect the geographical coordinates may be pre-stored within the accessible switch 106.

The system 100 in accordance with another aspect may include a first processor 120, provided within the accessible switch 106, configured to receive live location update of the emergency responder either via the second network 110 or another network 114. Further the first processor 120 may be configured to determine the proximity of the emergency responder 102 with the requestor 104. The proximity may be determined by comparing the current location of the emergency responder 102 and the requestor 104. Based on the proximity of the emergency responder 102, the first processor 120 may be configured to control a speaker system 122 configured to generate sound, and/or at one light source 124 configured to illuminate.

The speaker system 122 and/or the at one light source 124 may be controlled by a controller 126. The controller 126 configured to control the intensity of the speaker system 122 and/or the at one light source 124, may be communicably connected to the first processor 120. The intensity of the speaker system 122 and/or the at one light source 124, is changed so as to facilitate or assist the emergency responder 102 to locate the location of the requestor 104. Further the speaker system 122 and/or the at one light source 124, may be mounted on a mailbox 138. Further the mailbox 126 may be placed or positioned around a periphery 128 of the house 108 or premises 108 such that the mailbox 138 is visible to the emergency responder 102.

Further in another aspect the first processor 120, may be provided within the mailbox 138. Further a first network 130 may be configured to communicably connect with the accessible switch 106. Further the first processor 120 may be configured to receive live location update of the emergency responder from the accessible switch 106 via the first network 130. Further the first processor 120 may be configured to determine the proximity of the emergency responder 102 with the requestor 104. The proximity may be determined by comparing the current location of the emergency responder 102 and the requestor 104. Based on the proximity of the emergency responder 102, the first processor 120 may be configured to control the speaker system 122, and/or the at one light source 124.

Further the intensity of the speaker system 122 and/or the at one light source 124 may be controlled by the controller 126. Further the controller 126 may be communicably connected to the first processor 120. The intensity of the speaker system 122 and/or the at one light source 124, is changed so as to facilitate or assist the emergency responder 102 to locate the location of the requestor 104.

In accordance with the exemplary embodiment the system may further comprise a power source 132. The power source 132 may be configured to provide power to at least one of the first processor 120, the first network 130, the speaker system 122, the at one light source 124, and/or the controller 126. The power source 132 may be a solar panel 134 or an electric grid connection 136, and may be optionally connected to a battery to provide backup power in case of unavailability of power from the solar panel 134 or the electric grid connection 136.

Figure 2:
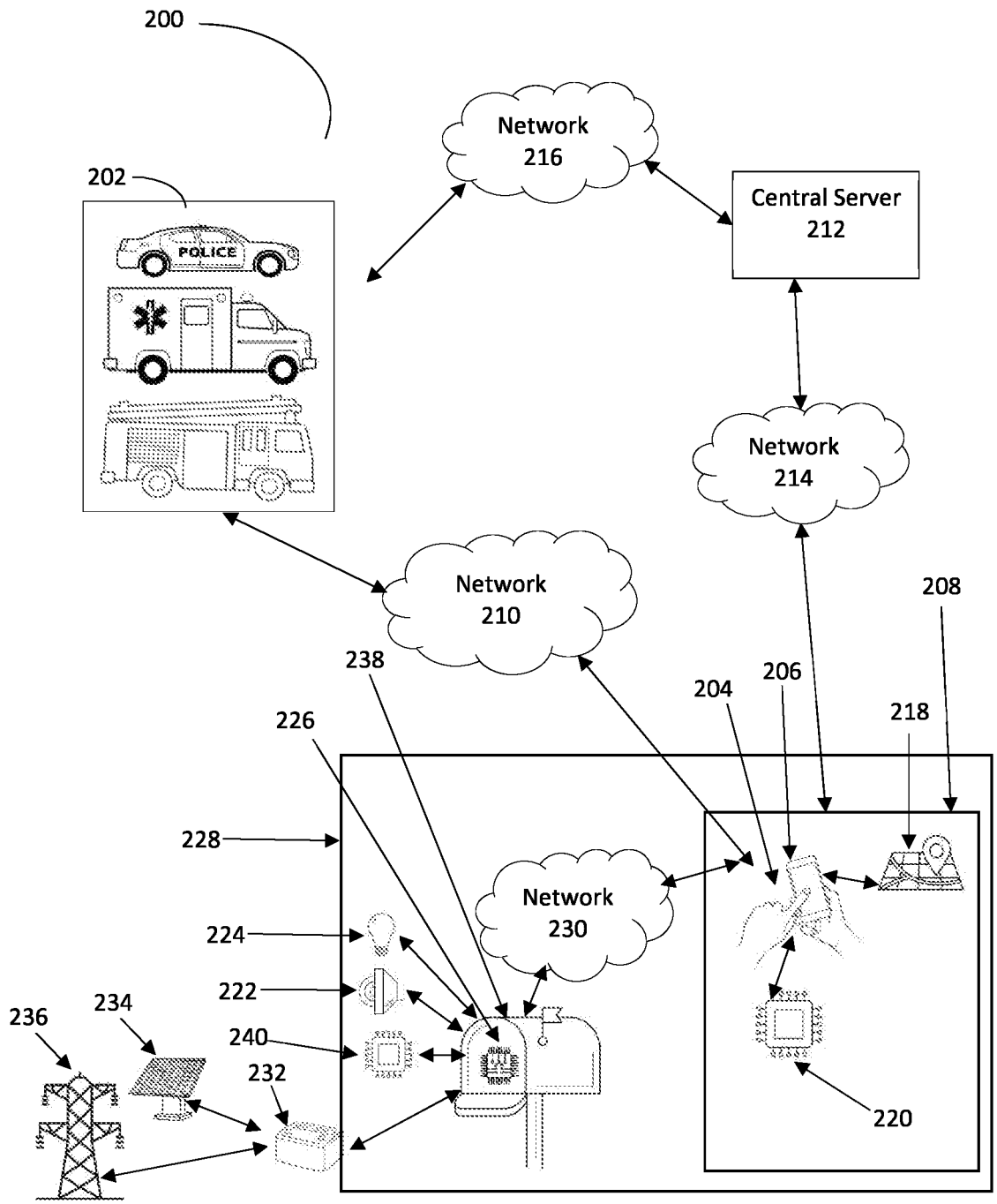
FIG. 2 illustrates a system for facilitating location sharing between an emergency responder and a requester, in accordance with another exemplary embodiment.

FIG. 2 illustrates a system for facilitating location sharing between an emergency responder and a requester, in accordance with another exemplary embodiment. The system 200 may include the emergency responder 202 and the requester 204. The requestor 204 may initiate or activate an emergency request using a means for alerting. The means for alerting may be a mobile device 206 and easily accessible by the requestor 204 in an emergency situation. Further the mobile device 206, may be configured to detect an emergency situation and automatically initiate the emergency request.

In an aspect of the present disclosure the mobile device 206 may be configured to enable a communication between the requestor 204 and the emergency responder 202 via a second network 210 configured to provide a second communication means. In another aspect of the system 200, the mobile device 206 may be programed to send or broadcast a set of pre-defined messages directly to the emergency responder 202 using the second network 210. Further in accordance with another aspect of the disclosure the communication between the requestor 204 and the emergency responder 202 may be routed through a central server 212 using another network 214. The central server 212 may be manned by a user or an artificial intelligence application. Further the central server 212 may be configured to capture the necessary information based on type of alert activated or initiated by the requestor 204 and share the same via independent network 216.

Further in accordance with the aspect of the disclosure the emergency responder 202 is configured to receive location of the requestor 204 via either directly via the mobile device 206 or from the central server 212. The location of the requestor 204 may be represented in a geographical coordinates form that is determined using a first global positioning system 218. The first global positioning system 218 may be embedded into the mobile device 206.

The system 200 in accordance with the aspect may include a first processor 220, provided within the mobile device 206, configured to receive a live location update of the emergency responder 202 either via the second network 210 or another network 214. Further the first processor 220 may be configured to determine the proximity of the emergency responder 202 with the requestor 204. The proximity may be determined by comparing the current location of the emergency responder 202 and the requestor 204. Based on the proximity of the emergency responder 202, the first processor 220 may be configured to control a speaker system 222 configured to generate sound, and/or at one light source 224 configured to illuminate.

The speaker system 222 and/or the at one light source 224 may be controlled by a controller 226. The controller 226 may be configured to control the intensity of the speaker system 222 and/or the at one light source 224, may be communicably connected to the first processor 220 via a first network 230. Further the intensity of the speaker system 222 and/or the at one light source 224, is changed so as to facilitate or assist the emergency responder 202 to locate the location of the requestor 204. Further the speaker system 222 and/or the at one light source 224, may be mounted on a mailbox 238. Further the mailbox 238 may be placed or positioned around a periphery 228 of a house 208 or premises 208 such that the mailbox 238 is visible to the emergency responder 202.

In accordance with the exemplary embodiment the system may further comprise a power source 232. The power source 232 may be configured to provide power to at least one of the first network 230, the speaker system 222, the at one light source 224, and/or the controller 226. The power source 232 may be a solar panel 234 or an electric grid connection 236, and may be optionally connected to a battery to provide backup power in case of unavailability of power from the solar panel 234 or the electric grid connection 236.

Further in another exemplary aspect a second processor 240, may be provided within the mailbox 238. Further the first network 230 may be configured to communicably connect with the mobile device 206. In accordance with the exemplary embodiment the mobile device 206 may be configured to connect with the second processor 240, and may further comprise an authentication process for the connection via the first network 230. Further the second processor 240 may be configured to receive live location update of the emergency responder from the mobile device 206 via the first network 230. Further the second processor 220 may be configured to determine the proximity of the emergency responder 202 with the requestor 204. The proximity may be determined by comparing the current location of the emergency responder 202 and the requestor 204. Based on the proximity of the emergency responder 202, the second processor 240 may be configured to control the speaker system 222, and/or the at one light source 224.

Further the intensity of the speaker system 222 and/or the at one light source 224 may be controlled by the controller 226. Further the controller 226 may be communicably connected to the second processor 240. The intensity of the speaker system 222 and/or the at one light source 224, is changed so as to facilitate or assist the emergency responder 202 to locate the location of the requestor 204.

Further the power source 232 may be configured to provide power to at least one of the second processor 220, the first network 230, the speaker system 222, the at one light source 224, and/or the controller 226. The power source 232 may be a solar panel 234 or an electric grid connection 236, and may be optionally connected to a battery to provide backup power in case of unavailability of power from the solar panel 234 or the electric grid connection 236.

The network(s) 110, 114, 116, 130, 210, 214, 216, and 230 as illustrated in FIG. 1 to FIG. 2 are an example communication infrastructure in which the connected devices discussed in various embodiments of this disclosure may communicate. The network(s) 110, 114, 116, 130, 210, 214, 216, and 230 may be and/or include the Internet, a private network, public network or other configuration that operates using any one or more known communication protocols such as, for example, transmission control protocol/Internet protocol (TCP/IP), Bluetooth®, BLE®, Wi-Fi based on the Institute of Electrical and Electronics Engineers (IEEE) standard 802.11, UWB, and cellular technologies such as Time Division Multiple Access (TDMA), Code Division Multiple Access (CDMA), High-Speed Packet Access (HSPDA), Long-Term Evolution (LTE), Global System for Mobile Communications (GSM), and Fifth Generation (5G), to name a few examples.

Figure 3:
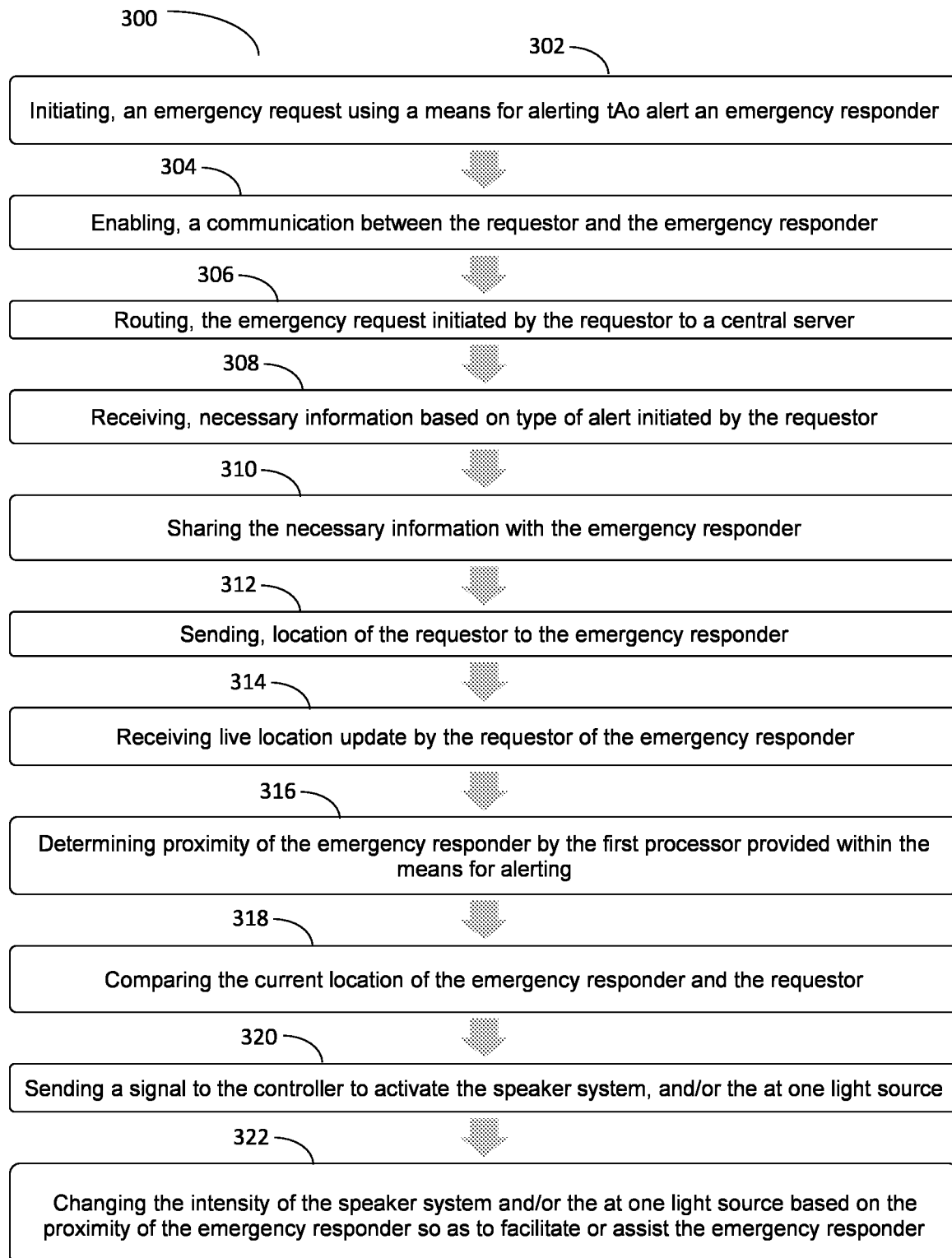
FIG. 3 depicts a flow diagram for a method facilitating location sharing between an emergency responder and a requester.

FIG. 3 depicts a flow diagram for a method facilitating location sharing between an emergency responder and a requester. In accordance with FIG. 1 and FIG. 3 the method 300 starts at step 302. At step 302, the method 300 may include initiating, by the requester 104, an emergency request using a means for alerting 106 to alert an emergency responder 102. Further at step 304, the method may further include enabling, using the second network 110, a communication between the requestor 104 and the emergency responder 102. In another aspect at step 306, the method may further include routing, using another network 114 the emergency request initiated by the requestor 104 to a central server 112. Further at step 308, the method may further include receiving, by the central server 112 necessary information based on type of alert initiated by the requestor 104. At step 310, the method may further include sharing, by the central server 112 via independent network 116 the necessary information with the emergency responder 102.

In accordance with the exemplary aspect at step 312, the method may further include sending a location of the requestor 102 to the emergency responder 102 using the second network 110. At step 314, the method may further include receiving live location update by the requestor 104, of the emergency responder 102 via the second network 110 or another network 114. Further at step 316, the method may further include determining proximity of the emergency responder 102 by the first processor 120 provided within the means for alerting 106. At step 318, the method may further include determining the proximity further comprises comparing by the first processor 120 the current location of the emergency responder 102 and the requestor 104.

Further at step 320 the method may further include sending a signal to the controller 126 via the first network 130 to activate the speaker system 122, and/or the at one light source 124. Further at step 322, the method may further include changing the intensity of the speaker system 122 and/or the at one light source 124, based on the proximity of the emergency responder 102 so as to facilitate or assist the emergency responder 102 to locate the requestor 104.

Further, where appropriate, the functions described herein can be performed in one or more hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A system for facilitating location sharing between an emergency responder and a requester, the system comprising:
   a means for alerting, wherein the means for alerting is accessible by the requester and is further configured to alert an emergency responder; and
   a mailbox placed in a visible location on a periphery of a house, wherein the mailbox is communicably connected to the means for alerting, the mailbox further comprises:
   a first processor;
   a first global positioning system communicably connected to the first processor;
   a speaker system communicably connected to the first processor;
   at least one light source communicably connected to the first processor;
   a power source configured to provide power to the first processor, the first positioning system, the speaker and the at least one light source; and
   a first communication means configured to communicably connect the means for alerting with the mailbox, wherein the first processor is configured to:
receive a live location of the emergency responder,
detect proximity of the emergency responder by comparing the live location of the emergency responder with a location of the mailbox, wherein the location of the mailbox is provided by the first global positioning system, and
activate the speaker and/or the light source, and further change intensity of the speaker and/or the light source as the emergency responder is in proximity of the mailbox.

2. The system as claimed in claim 1, wherein the means for alerting further comprises a second communication means configured to enable communication between the requester and the emergency responder.

3. The system as claimed in claim 1, wherein the means for alerting is configured to share geographical location of the requester with the emergency responder using the first position system.

4. The system as claimed in claim 1, wherein a second positioning system connected with the emergency responder is configured to determine location of the emergency responder and share the location with the requester.

5. The system as claimed in claim 4, wherein the emergency responder further facilitates sharing the live location with the first processor in the mailbox, via the requester.

6. The system as claimed in claim 1, wherein the means for alerting is an accessible switch provided within accessible reach of the requestor.

7. A system for facilitating location sharing between an emergency responder and a requester, the system comprising:
a mailbox having a power source, wherein the mailbox further comprises:
a first communication means, installed withing the mailbox;
a controller mounted within the mailbox, and communicably connected with the first communication;
a speaker system communicably connected to the controller via the first communication means;
at least one light source communicably connected to the controller via the first communication means;
a mean for alerting, communicably connected with the mailbox via the first communication means, wherein the means for alerting is accessible by the requester and is further configured to alert an emergency service or an emergency responder; and
a first positioning system embedded within the means for alerting,
wherein the controller is configured to:
receive a live geographical coordinates of the emergency responder,
detect proximity of the emergency responder by comparing the live geographical coordinates of the emergency responder with geographical coordinates of the mailbox, wherein the geographical coordinates of the mailbox are provided by the first global positioning system, and
activate the speaker and/or the light source, and further change intensity of the speaker and/or the light source as the emergency responder is in proximity of the mailbox.

8. The system as claimed in claim 7, wherein the means for alerting is a handled device configured to enable communication with the emergency responder.

9. The system as claimed in claim 8, wherein the handled device is further configured to share geographical coordinates of the requester with the emergency responder and further receive the live geographical coordinates of the emergency responder at defined intervals.

10. A method for facilitating location sharing between an emergency responder and a requester, the method comprises:
initiating, by the requester, an emergency request using a means for alerting to alert an emergency responder;
receiving live location update, by the requestor, of the emergency responder via a second network or another network;
determining proximity of the emergency responder by a first processor provided within the means for alerting;
sending a signal to a controller via a first network to activate a speaker system, and/or at least one light source of a mailbox placed in a visible location on a periphery of a house, based on the proximity of the emergency responder; and
changing the intensity of the speaker system and/or the at least one light source, based on the proximity of the emergency responder so as to facilitate or assist the emergency responder to locate the requestor.

11. The method as claimed in claim 10, wherein determining the proximity further comprises comparing by the first processor the live location of the emergency responder and the requestor.

12. The method as claimed in claim 11, further comprises enabling, using the second network, a communication between the requestor and the emergency responder.

13. The method as claimed in claim 12, further comprises sending, via the first processor, a location of the requestor to the emergency responder using the second network.

14. The method as claimed in claim 11, further comprising routing, via the first processor, the emergency request initiated by the requestor to a central server.

15. The method as claimed in claim 14, further comprising receiving, by the central server necessary information based on type of alert initiated by the requestor.

16. The method as claimed in claim 14, further comprising sharing by the central server via independent network the necessary information with the emergency responder.

* * * * *